Feb. 4, 1958 R. B. ATKINSON ET AL 2,822,427

METHOD AND APPARATUS OF PRODUCING VARIABLE AREA MAGNETIC RECORDS

Filed Oct. 8, 1951

INVENTORS
RALPH B. ATKINSON
STEVEN G. ELLIS
BY Fulwider & Mattingly
Attorneys

United States Patent Office 2,822,427

Patented Feb. 4, 1958

2,822,427

METHOD AND APPARATUS OF PRODUCING VARIABLE AREA MAGNETIC RECORDS

Ralph B. Atkinson, Beverly Hills, and Steven G. Ellis, Van Nuys, Calif.; said Ellis assignor to said Atkinson Application October 8, 1951, Serial No. 250,364

10 Claims. (Cl. 179—100.2)

Our invention relates generally to the magnetic recording of signals or other information, and more particularly to a method, and an apparatus utilizing this method, for producing what may be termed a "variable area magnetic recording."

Magnetic recording, on a specially designed tape or wire, has long been known and used, and the many advantages of such recording have widened the field of use immeasurably. Some of the principal advantages of magnetic recording are its capability of great accuracy and ability, the speed and simplicity with which recordings may be made, and the absence of the need for a photographic dark room, or similar processing area, and the lack of need for chemical treatment of the record. However, magnetic recording as heretofore practiced has generally been open to the objections that the record is not visible, and can only be reproduced and studied by means of a pickup or reproducing equipment.

It is possible, of course, to render the magnetic recording visible by flowing finely divided magnetic particles over the magnetic recording, the particles being held to the record material in amounts varying with the intensity of the residual magnetism of the particular area. A method and means for magnetic reproduction of pictures, using this general method of the flowing of magnetic particles over a magnetized record, is the subject of our copending application of the same title, Serial No. 221,044, filed April 14, 1951. The visible record formed upon the magnetizable record material may be transferred to another support, such as paper, by any one of a number of processes, several of which are disclosed in the aforementioned copending application. This making of visible records from magnetic records we have termed "ferrography," and we have designated the process as the "ferrographic process," thereby distinguishing from the photographic processes wherein light and light-sensitive materials are used.

Despite the opportunity to render magnetic records visible, as these records have previously been made, ferrography has seldom been used in the recording of technical data, because the resulting record shows only areas of different shades of colors, corresponding to the varying intensity of the residual magnetism in the record material. Such a record, which may be termed a "variable density record," has almost always been of a uniform width, since it has been produced by a magnetic recording head having a substantially uniform gap to produce a field through which the record medium moves. Such a record, which may be referred to as a "constant area, variable density record," corresponds to the variable density type of sound track used in the motion picture industry. However, the average human cannot evaluate differences in density as well as he can differentiate differences in size or length. Consequently, we have developed what we term "a variable area magnetic recording," corresponding to the variable area sound track of the motion picture industry.

Considered broadly, it will be appreciated that a variable area recording, where the height of the visible record at any given point corresponds to the intensity of the recorded signal, will have many fields of use. The record itself corresponds to an oscillogram, and combines the advantages of a record made by a direct reading, pen-type oscillograph, with a speed of response that approaches that of the cathode ray oscilloscope. In addition, the disadvantages of the photographic method of recording, encountered in both the mirror-type oscillograph and the cathode ray oscilloscope are avoided.

With the foregoing in mind, it is therefore a major object of our invention to provide a method, and an apparatus making use of that method, for producing variable area magnetic recordings.

Another object of our invention is to provide such a method and apparatus that is capable of high speed response, so that signals of moderately high frequency may be recorded, the upper frequency limit of such recording being well above the upper frequency limit of pen-type oscillographs.

It is a further object of our invention to provide a method and apparatus of the class described in which the response of the record may be linear or exponential, as requirements may dictate.

Still another object of our invention is to provide apparatus using our new method which is rugged and dependable, and composed principally of standard components, so that maintenance and repairs are held to a minimum, and when necessary, are greatly simplified.

It is a further object of our invention to provide such a method and apparatus that are capable of providing visible records almost immediately upon the making of those records, without the use of chemically active treating solutions, or without the use of photographic treatment, or a photographic dark room.

These and other objects and advantages of our invention will become apparent from the following description of the method and the apparatus used in conjunction with that method, and from the drawings illustrating the method and apparatus, in which.

Figures 1, 2, 3, 4, 5, 6, 7, 8, 9, 10, 11:
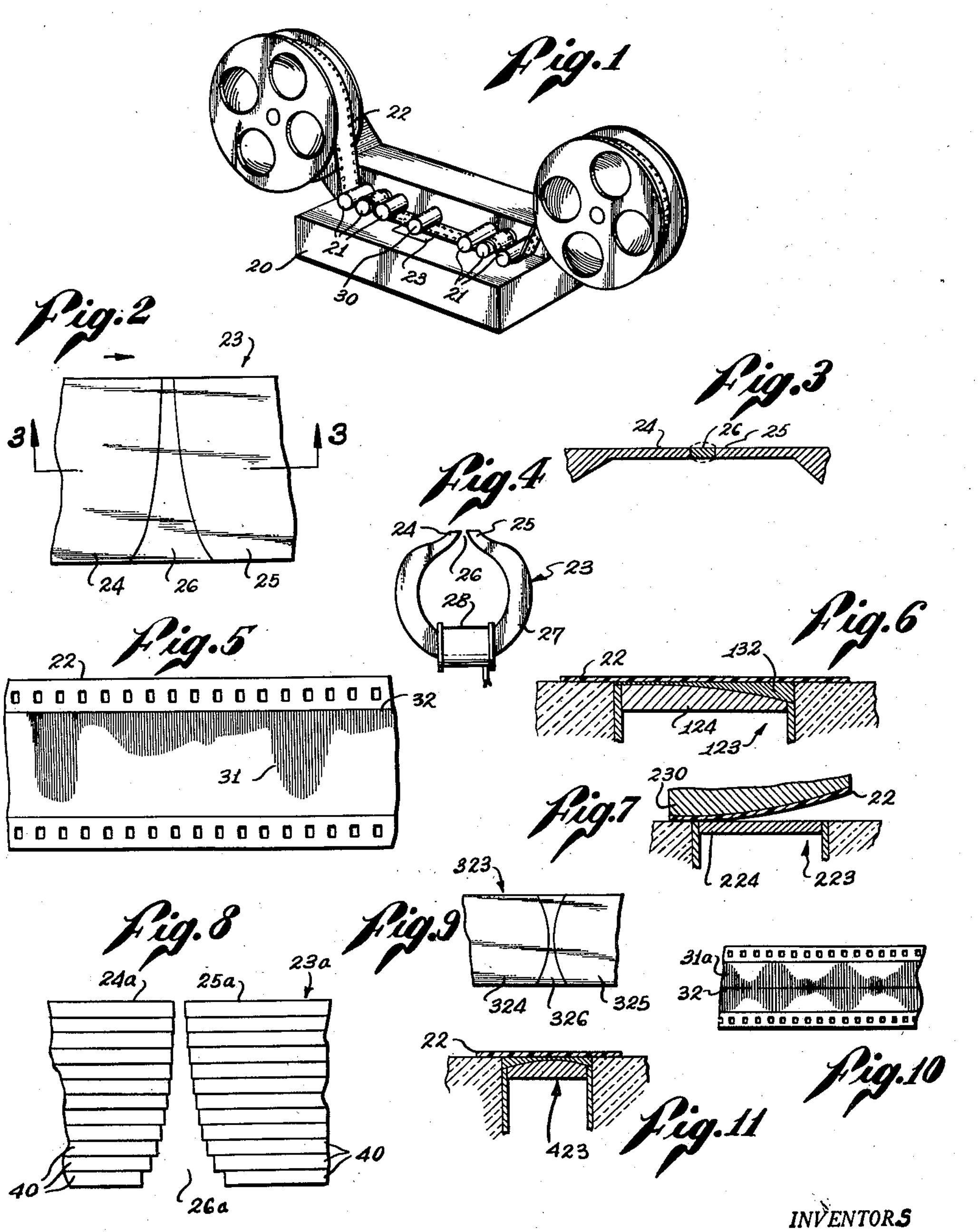
Fig. 1 is a perspective view of one form of variable area magnetic recorder constructed in accordance with our invention.
Fig. 2 is a plan view of a recording head that may be used with the apparatus shown in Fig. 1.
Fig. 3 is a cross-sectional view taken on the line 3—3 of Fig. 2, showing the pole pieces and the gap of the magnetic head.
Fig. 4 is a somewhat schematic side elevational view of a magnetic recording head that may be used in the practice of our invention.
Fig. 5 is a view of a magnetic record that is formed by the use of our invention.
Fig. 6 is a sectional view taken along the axis of the gap, showing another form of construction that provides a variable area magnetic record.
Fig. 7 is a view similar to Fig. 6, but of a slightly different form of construction.
Fig. 8 is a plan view of a magnetic recording head, generally similar to Fig. 2, but with laminated instead of solid pole pieces.
Fig. 9 is a plan view of a variable area recording head adapted to form a double-wave form, instead of the single-wave form provided by the head of Fig. 2.

Fig. 10 is a view of a variable area magnetic record illustrating the double-wave form of record, such as produced by the head shown in Fig. 9; and Fig. 11 is a sectional view along the longitudinal axis of a modified form of magnetic recording head, illustrating how the separation of the gap from the recording material, shown in Fig. 6, may be varied to produce the double-wave form type of record, as shown in Fig. 10.

Essentially, our invention contemplates the use of a magnetic tape transport means, a magnetic recording head against which the tape bears and across which it passes while being transported, and associated modulating, amplifying, and allied equipment. Thus, in Fig. 1 we have illustrated one embodiment of our device wherein a cabinet or housing 20 encloses motor means (not shown) that acts to drive film sprockets or rollers 21 to transport a magnetizable tape 22 past a magnetic recording head 23. The motor means should, of course, drive the tape 22 at a uniform speed so that measurements with respect to time may be easily carried out. The tape 22 is preferably perforated, in the general manner of motion picture films, but in certain cases, an unperforated tape may be used, and the sprockets or rollers 21 may be covered with a suitable material for frictionally engaging and driving the tape.

The magnetic recording head 23 may be constructed along the general lines of the conventional magnetic recording head, but instead of having a substantially uniform gap width, the gap of our device is tapered or otherwise constructed so that the magnetic flux passing through the magnetizable tape is less at one point on the gap than it is on another point thereof. For example, the fragmentary portion of the magnetic recording head shown in Fig. 2 has a pair of pole pieces 24 and 25 that are separated by a gap 26 that is preferably filled with a hard, non-magnetic material. The tape 22 moves across the gap in the direction of the arrow, and the width of the gap in this transverse direction varies as the point of measurement moves perpendicularly to the transverse direction, along the longitudinal axis of the gap. Thus, the gap shown in Fig. 2, may be said to be V-shaped, since the gap is quite small at one end of its longitudinal axis, adjacent one side of the pole pieces 24 and 25, and is quite large at the other end of the longitudinal axis, adjacent the opposite sides of the pole faces. It will be appreciated, of course, that the gap shown in Fig. 2 has been distorted and greatly enlarged to more clearly illustrate the construction and operation of our apparatus, since the transverse dimension of a magnetic gap of this general nature is in the range of one one-thousandth of an inch.

When the pole pieces 24 and 25, forming a portion of a magnetic circuit, are energized, lines of magnetic flux will extend across the gap 26. At low levels of energization, the lines of flux will be concentrated at the narrowest portions of the gap 26, since the magnetic reluctance at the wider portions of the gap is sufficient to prevent lines of flux from extending across this portion of the gap. When the pole pieces 24 and 25 are very strongly magnetized, the reluctance of the wider portions of the gap become less important and the narrower portions of the gap become saturated, and as a result the magnetic lines of force cross the gap along its entire length. At intermediate levels of energization, the lines of flux may be considered as crossing the gap along a portion of its length, so that by varying the magnetic energization of the pole pieces 24 and 25, the magnetic lines of force may be considered as extending across more or less of the gap.

While it is true that the magnetic condition of the gap 26 is not restricted solely to either a completely demagnetized state, or to a completely magnetized or saturated state, when a gap of this type is used with a magnetizable tape, there appears to be some critical value below which a readily visible record cannot be formed, and above which a readily visible record can be formed. The formation of the visible record will be described hereinafter, and the reason for the apparent sharpness of the critical state is not clearly understood. However, we have found by experiment that such a condition and phenomenon do exist, and consequently, for the purposes of the present description, the gap may be considered as divided into two longitudinally extending sections, one magnetized, and the other unmagnetized.

To energize the pole pieces 24 and 25, we provide a magnetic yoke 27 connecting the pole pieces, and mount a coil 28 on the yoke or other suitable portion of the magnetic circuit thus formed. Such a magnetic recording head, as indicated in a more or less schematic manner in Fig. 4, is comparable to magnetic recording heads previously known and used, but differs from these previous heads in the shape and operation of the gap 26. The input terminals of the coil 28 are connected to a suitable amplifier and control circuit which may be any one of a number of suitable types. Fundamentally, such a circuit includes the sensing or pick-up element that is connected to a modulator, and the output of the modulator is amplified and applied to the coil 28. A high frequency bias may sometimes be combined with the output of the amplifier, but this generally is not necessary where only a visual record is to be made. A schematic representation of such a circuit providing a bias, is shown in our aforementioned copending application, Serial No. 221,044. For convenience, we prefer to include the modulator, if used, within the housing 20, but this is not essential, and the elements may be located wherever desired.

It will be noted that the gap 26, shown in Fig. 2, does not have divergent straight sides, but instead has curved sides. The reason for this curvature of the sides may be found in the fact that the magnetization of the gap is not a linear function of the gap width, but instead is generally an exponential function. Consequently, in order for the magnetized portion of the gap length to vary linearly with an increase in magnetization of the pole pieces 24 and 25, the ends of those pole pieces, corresponding to the sides of the gap 26, must be formed to provide a non-linear or curved compensating shape.

It can be shown that the magnetic characteristics of the tape or recording medium play an important part in determining the final shape of the gap 26, but at the present time, the magnetic characteristics of commercially available tape are not sufficiently uniform to permit extensive calculations to be made for determining the shape of the gap for a particular lot of tape. Consequently, it will be recognized that the shape of the gap 26 shown in Fig. 2 is by way of illustration only.

Since many control or sensing devices provide a signal of very low power, it is desirable to provide an amplifier for increasing and standardizing the signal. Additionally, because of the random frequencies or the range of frequencies that may be recorded, it is considered advisable to use the signal from the sensing or control element to modulate a higher frequency carrier signal.

The theoretical maximum value of the carrier frequency can be determined by a consideration of the maximum gap width between the pole pieces 24 and 25, and the linear speed of the magnetic record material 22. It is well known in magnetic tape recording that when the frequency of the information being recorded upon the tape equals the number of gap widths that the tape moves per second, there is an excessive attenuation of the information recorded upon the tape. For example, if the maximum width of the gap 26 is one one-thousandth of an inch, and the tape or magnetic record material 22 moves at the linear speed of fifteen inches per second, the tape will move fifteen thousand gap widths per second. Consequently, there will be a very great attenuation of a signal having a frequency of fifteen thousand cycles per second. This phenomenon is well-known and is generally referred to as "gap attenuation," and is comparable to a similar situation occurring in the recording of sound on motion picture film where the phenomenon is known as "slot cancellation." We have found that if the carrier frequency is approximately eight-tenths of the frequency at which gap attenuation occurs, very satisfactory results are obtained.

It is important, of course, that the carrier frequency be greater than the greatest frequency of the signal to be recorded. Consequently, if a high frequency signal is to be recorded, the carrier frequency must be even higher, and to prevent gap attenuation, the speed of the tape 22 must be high, or the maximum width of the gap 26 must be small. Similarly, if only low frequencies are to be recorded, the tape speed may be lower or the gap width may be smaller. These factors are well-known in the field of audio-engineering and especially in the field of magnetic recording.

Considering next the operation of our variable area magnetic recorder, and assuming that a V-shaped gap 26, similar to that shown in Fig. 2, is used, the magnetic record or tape 22 is moved between the pole pieces 24 and 25, across the gap 26. A pad or pressure member 30, shown in Fig. 1, holds the tape 22 firmly against the pole pieces 24 and 25 in the immediate vicinity of the gap 26, and the modulated and amplified signal from the control and sensing member (not shown) is applied to the coil 28 to produce a magnetic flux in the gap 26. As the signal from the sensing or control element varies, the portion of the gap 26, measured along the longitudinal axis of that gap, that is magnetized sufficiently to produce a record capable of being made visible will correspondingly vary. Thus, if the longitudinal dimension of the gap 26 is one inch, and a signal of one volt magnetizes the gap for a distance of one-tenth of an inch measured along its longitudinal axis, a signal of five volts will magnetize the gap for one-half inch, and a signal of ten volts will magnetize the entire length of the gap. A varying signal such as that just described will produce a magnetic record in the tape 22 which, after having been rendered visible in a manner hereinafter described, produces a visible recorded signal record, such as that shown in Fig. 5.

It will be noted that the record shown in Fig. 5 is made up of a large number of individual lines of different length, extending transversely across the tape 22, in a direction that is along the longitudinal axis of the gap 26. Each of these individual lines indicates the magnetization of the tape 22 by an individual cycle of the carrier signal, and the envelope of these individual lines corresponds to the recorded signal of the control or sensing element. Since the carrier signal is of a relatively high frequency, the visible representation of the signal from the sensing device is, to all practical intents and purposes, indicated by a varying area of solid color.

The foregoing discussion has been based upon the assumption that the amplifier associated with the recording head 23 has an output that linearly corresponds with its input. It is possible, of course, to construct amplifiers that have a rising or a drooping response curve, and it is sometimes advisable to provide such an amplifier in order to eliminate some of the need for special shaping of the pole pieces 24 and 25. Even more preferable, however, is the provision of an amplifier whose response curve may be varied, so that variations in the magnetic properties of the individual tape 22 may be compensated for by adjustment of the amplifier controls, rather than by changes in the shape of the pole pieces 24 and 25.

To render visible the recorded magnetic signal indicated generally by the numeral 31 in Fig. 5, various methods are available. One simple method includes the flowing of mixture of finely divided ferromagnetic particles, carried in a suitable vehicle over the tape 22, and then allowing the mixture to drain from the tape.

The ferromagnetic particles may be very finely ground or powdered iron, or any of the other magnetic powders generally available on the market. The vehicle may be a very light oil, such as kerosene, a light lubricating oil, etc. After the mixture has been flowed across the tape 22 and allowed to drain off, a record comparable to the record 31 shown in Fig. 5 will be observed upon the tape. If a relatively volatile vehicle has been used, it may be allowed to evaporate, or it may be removed by a volatile thinner or solvent, such as carbontetrachloride, gasoline, etc. The visible record 31 will then consist of the finely divided magnetic particles held to the tape 22 by the residual magnetism therein, and if desired, the record may be transferred to another support, such as paper, by suitable transfer means such as are disclosed in our aforesaid copending application. If no transfers or prints are to be made, the record may be protected against damage, as by smudging, by coating the surface of the tape 22 with a suitable protective medium, such as lacquer.

In those cases where the use of a liquid is not feasible to render the record 31 visible, other methods may be used. For convenience, we refer to the treatment of the tape 22 to render the magnetic record 31 visible as the rendering process, and the medium used in the process as the rendering medium.

The liquid rendering medium just described relies for its action upon the retention of finely divided ferromagnetic particles on the surface of the tape 22. Substantially the same results can be obtained by blowing such a powder across the surface of tape 22, and then directing a stream of air across the surface of the tape to remove the excess powder. Generally, this method of rendering is not quite so satisfactory as the use of a liquid rendering agent, since too weak a blast of air will not remove the particles of the rendering powder that cling to the tape where there is no residual magnetism. Likewise, too strong a blast of air will remove particles from the tape even though those particles are attracted to the tape by the residual magnetism therein. Consequently, where practical, we prefer to use a liquid rendering agent, but in many places, a dry rendering process must be used. For example, in making a record in an aircraft, and particularly where that record is to be studied within very few seconds of its formation, the dry rendering process, making use of a powdered rendering agent, is to be preferred.

It will be appreciated that the lines of magnetic flux extending between the pole pieces 24 and 25 do not remain solely in the space directly between these two pole pieces, but instead spread a slight amount, extending a slight distance above the horizontal pole piece faces. This spreading, indicated by the dotted lines in Fig. 3, permits the tape 22 to be moved across the upper surface of the pole pieces 24 and 25 and to be magnetized by the magnetic flux between these pole pieces that spreads and extends into the tape. Of course, the greater the distance from the plane of the pole pieces 24 and 25, the fewer lines of magnetic flux there will be. This feature may be used to construct a magnetic head acting to produce the same general results as the previously described head with the V-shaped gap 26, the optional form of recording head having a gap whose width is uniform throughout its longitudinal axis. A sectional view of such a gap, taken along the line parallel to the longitudinal axis of the gap and just within one of the pole pieces, is shown in Fig. 6.

As indicated in that figure, a magnetic head 123 is provided, having a pair of pole pieces, one of which, 124, is shown. The gap between the pole pieces is similar to the gap of conventional magnetic recording heads, having straight parallel sides perpendicular to the direction of the tape travel. However, the upper surface of the pole pieces, adjacent the tape 22, is not flat but is curved as shown in the drawing, so that one end of the gap is separated a material distance from the tape. The opposite side of the pole piece, at the opposite end of the gap is spaced a very slight distance from the tape 22, and may, under some conditions, be in actual physical contact with the tape. The space between the pole piece 124 and the tape 22 is filled with a nonmagnetic material forming a spacing member 132, and this spacing material may be formed as a continuation of the nonmagnetic material positioned in the gap. Preferably, the material forming the spacing member 132 is quite hard, thus resisting the wear imposed upon it by the movement of the tape 22 thereacross.

It will be appreciated that at low levels of magnetization of the magnetic recording head 123, the flux entering the magnetic tape 22 will be concentrated in the region of the portion of the pole piece 124 nearest the tape, the left-hand side of the tape as shown in Fig. 6. As the magnetization of the head 123 is increased, the tape 22 will be magnetized over a greater portion of its width, until at the limiting value, the entire portion of the tape between the opposite sides of the pole piece 124 will be magnetized. It will be appreciated, of course, that the shape of the upper surface of the pole piece 124, and its separation from the tape 22 are not necessarily to scale, but have been exaggerated to show the principles of construction and operation. The record formed by the head 123 is similar to that formed by the previously described head 23 having the V-shaped gap 26.

As an alternate form of construction, instead of curving the adjacent surface of the pole pieces to provide the necessary separation from the tape 22, the tape itself may be bent while the adjacent surfaces of the pole pieces are flat. This alternate construction is illustrated in Fig. 7, where we have shown a magnetic recording head 223, generally similar to the head 123 shown in Fig. 6, but with the upper surfaces of the pole pieces, such as the pole piece 224, flat. The tape 22 is held against a pad or backing member 230, the latter being curved in the plane of a longitudinal axis of the gap so that the tape is spaced a variable distance from the gap. The operation of this alternate form of recording head 223 is similar to that of the previously described head shown in Fig. 6, and the results, insofar as the production of the record 31 is concerned, are similar. The optional form of head, shown in Fig. 7, has the advantage that the separation of the tape 22 from the magnetic gap can easily be changed by replacing the pad 230 by another pad having a slightly different shape. However, the optional head does have the disadvantage that it is necessary to curve or bend the tape 22, and this may occasionally offer difficulties.

In the magnetic recording heads heretofore described, it has been assumed that the pole pieces are of solid or block construction. However, the pole pieces may very properly be constructed of a series of laminations that are placed adjacent one another. In this manner, laminations may be stamped from suitable material, each lamination having its own individual width of gap, and this gap remaining uniform throughout the length thereof, measured along the longitudinal axis of the gap. In Fig. 8, we have illustrated a magnetic recording head 23*a*, constructed in accordance with this method, and corresponding to the general form of head shown in Fig. 2. Thus, the magnetic recording head 23*a* comprises a pair of pole pieces 24*a* and 25*a* separated by a gap 26*a*, each of the pole pieces being formed of a series of laminations 40. The gap 26*a*, instead of having smoothly curving sides, has sides that diverge from each other in a series of steps, corresponding to the individual laminations 40.

The record formed by the magnetic recording head 23*a* will, in general, be similar to the record 31 shown in Fig. 5, with the exception that the length of the individual lines, produced by the carrier signal, will vary in discrete steps, corresponding to the individual laminations 40, instead of being continuously variable. Thus, a recording head 23*a* may be made whereby a record may be formed by the individual laminations, the record produced by each lamination differing from the record of the adjacent laminations by one volt. Thus, the visible record produced by such a head 23*a* would be accurate to one volt, whereas the record produced by a magnetic head 23, such as previously described, would be accurate to less than one volt.

The visible record 31 formed upon the tape 22 by any of the magnetic recording heads heretofore described, including the heads 23, 23*a*, 123, and 223, has what may be considered a base line or zero point, from which the individual lines formed by the carrier signal extend in one direction. Thus, in Fig. 5, the edge 32 of the record 31 may be considered the base line, and all measurements of the height or length of the individual carrier signal lines are made between the straight base line, and the envelope of the individual lines. Thus, the signal 31 varies in only one direction from the base line 32. It is sometimes desirable to have a recorded signal 31*a* that varies in two directions from the base line. Such a signal provides a double envelope, and the intensity of the signal may be determined by measuring between the two envelopes, or by measuring from the base line to either of the envelopes. A signal of this type, as shown in Fig. 10, may be referred to as a bilateral signal, while the signal 31, shown in Fig. 5, may be referred to as a unilateral signal. These terms correspond to generally similarly recorded signals of the variable area type produced by optical means, as used on motion picture film.

To produce the bilateral type of record 31*a*, we may employ a magnetic recording head 323, shown in Fig. 9, and comprising a pair of pole pieces 324 and 325, whose adjacent faces are shaped to provide a double V- or X-type of gap 326. The narrowest point of the gap will normally be in the center thereof, measured along the longitudinal axis, so that there is an equal distance from this narrowest point to the sides of the pole pieces 324 and 325, measured in either direction from this center point. Likewise, it is important that each half of the gap 326 be identical to the other half, so that the recorded signal 31*a* is symmetrical about its base or center line 32.

As an alternate form of construction, a magnetic recording head having a gap of uniform width may be employed, with the spacing of the tape 22 from that gap varied in either direction from a center point, in a manner generally similar to the unilateral form shown in Fig. 6. An example of a bilateral recording head 423 making use of this varying spacing is shown in Fig. 11. In a comparable manner, the tape 22 may be bent or curved about its longitudinal axis and held at varying distances from the recording head, in a manner generally similar to that shown in Fig. 7, but with the tape curved and positioned so that the tape is closest the magnetic recording head at a point near the longitudinal center of the tape, and extends away from the head on each side of this center. It will be recognized that these so-called bilateral magnetic recording heads are substantially identical to doubled versions of the unilateral recording heads previously described. By the same token, the pole pieces may be of either solid or laminated construction.

Throughout the preceding discussion, it has been assumed that the signal from the control or sensing element has been used to amplitude-modulate the carrier frequency so that the resulting signal applied to the recording head is of constant frequency and variable amplitude. However, frequency modulation of a carrier signal can also be used, and very satisfactory results are obtained in this manner. However, the theory of operation in the case of a frequency modulated signal is considerably different from that of the amplitude modulating signal.

It will be recalled that the carrier frequency was selected to have a numerical value approximately equal to eight-tenths times the number of gap widths per second that the tape moved, the gap width in this equation being the maximum width of the gap 26. When the cycles per second equal the number of gap widths per second, the phenomenon known as "gap attenuation" occurs, and for the present purposes, it may be considered that no useable signal is recorded upon the tape under these circumstances.

If the dimensions of gap, the speed of the tape, and the frequency of the carrier signal are selected so that at a point substantially in the center of the gap, as measured along its longitudinal axis, the phenomenon of gap attenuation occurs, a magnetic record will be formed in those portions of the tape passing over the narrower portions of the gap. In the wider portions of the gap, no signal will be recorded upon the tape. Under the circumstances, a record would be made that was approximately half magnetized, and half unmagnetized. If the carrier frequency is then increased, the speed of the tape remaining the same, gap attenuation will occur at narrower portions of the gap, and hence the magnetized portion of the record will be decreased. Similarly, if the carrier frequency is lowered or decreased, gap attenuation will be found to occur in only the wider portion of the gap, and hence the magnetized portion of the record will be increased. Consequently, a V-shaped gap, such as shown in Fig. 2, combined with a frequency modulated carrier signal, provides another means and method of producing a variable area magnetic recording. In the same manner, a double V- or X-type gap, such as is illustrated in Fig. 9, can be used to produce a bilateral variable area recording such as illustrated in Fig. 10. Similarly, the pole pieces may be of solid or laminated construction.

Whether a frequency modulated or an amplitude modulated signal is used, it will be recognized that the magnetic recording head has a gap which produces a magnetizing effect upon the tape or magnetic record material that varies along the length of the gap, in a direction transverse to the direction of movement of the tape. In the case of the gaps shown in Figs. 6, 7 and 11, the varying magnetic effect is produced by gaps that act upon a magnetic record material spaced at a varying distance from the gap. In each case, however, the result is to produce a signal or magnetized portion of the tape that varies in area in accordance with the effective magnetizing length of the gap, this effective magnetizing length being controlled by the modulation of a signal in accordance with the output of a control or sensing device.

It will be recognized that if a record having a nonlinear response is desired, such as one having a logarithmic or exponential response, the shape of the gap and/or the response of the amplifier may be suitably modified. Such changes will be apparent to those skilled in the art.

While several different methods and devices for accomplishing our overall results have been shown and described, it will be appreciated that all of these methods and devices operate in accordance with the general terms set forth above. The selection of the particular type of device will largely be dependent upon the special requirements and conditions imposed by the overall problem, and further modifications of the forms shown may be necessary to meet special requirements. However, it will be recognized that we have provided a method and apparatus for producing variable area magnetic recordings fully capable of achieving the objects and securing the advantages heretofore set forth. As mentioned, modifications may be made that are clearly within the intended scope of our invention, and while we have shown and described several forms of our invention, it is to be understood that we do not wish to be restricted to the particular form, arrangement of parts, or sequence of steps, except as limited by our claims.

We claim:

1. A system for producing a variable area magnetic record of an external signal, which includes: a modulator adapted to receive said external signal and modulate a carrier signal thereby; a magnetic recording head having a field-producing gap, said gap, when said head is energized, producing an effective magnetic field whose extent along the longitudinal axis of said gap varies in accordance with the signal applied to said head; means connecting said recording head to said modulator, whereby said modulated carrier signal is applied to said head; and means for moving a magnetic record material across said gap in a direction generally perpendicular to the longitudinal axis thereof, said record material being positioned with respect to said gap in such a manner that said effective magnetic field produces a magnetic record whose width, measured perpendicular to the direction of movement of said record material, is a function of said external signal.

2. A system for producing a variable area magnetic record of an external signal, which includes: a modulator adapted to receive said external signal and frequency-modulate a carrier signal thereby; a magnetic recording head having a gap whose reluctance varies along the longitudinal axis thereof and is adapted to produce an effective magnetic field whose extent along said longitudinal axis varies in accordance with the frequency of the signal applied to said head; means connecting said recording head to said modulator, whereby said modulated carrier signal is applied to said head; and means for moving a magnetic record material across said gap in a direction generally perpendicular to the longitudinal axis thereof, whereby said effective magnetic field produces a magnetic record whose width, measured perpendicular to the direction of movement of said record material, is a function of said external signal.

3. A system for producing a variable area magnetic record of an external signal, which includes: a modulator adapted to receive said external signal and amplitude-modulate a carrier signal thereby; a magnetic recording head having a gap whose reluctance varies along the longitudinal axis thereof and is adapted to produce an effective magnetic field whose extent along said longitudinal axis varies in accordance with the amplitude of the signal applied to said head; means connecting said recording head to said modulator, whereby said modulated carrier signal is applied to said head; and means for moving a magnetic record material across said gap in a direction generally perpendicular to the longitudinal axis thereof, whereby said effective magnetic field produces a magnetic record whose width, measured perpendicular to the direction of movement of said record material, is a function of said external signal.

4. A system for producing a variable area magnetic record of an external signal, which includes: a modulator adapted to receive said external signal and amplitude-modulate a carrier signal thereby; a magnetic recording head having a gap; means connecting said recording head to said modulator, whereby said modulated carrier signal is applied to said head; and means for moving a magnetic record material across said gap in a direction generally perpendicular to the longitudinal axis thereof, said record material being spaced from said gap a distance that varies along the longitudinal axis of said gap, whereby the effective magnetic field of said head produces a magnetic record whose width, measured perpendicular to the direction of movement of said record material, is a function of said external signal.

5. A system for producing a variable area magnetic record of an external signal, which includes: a modulator adapted to receive said external signal and frequency-modulate a carrier signal thereby; a magnetic recording head having a generally V-shaped gap whose reluctance varies along the longitudinal axis thereof and is adapted to produce an effective magnetic field whose extent along said longitudinal axis varies in accordance with the frequency of the signal applied to said head; means connecting said recording head to said modulator, whereby said modulated carrier signal is applied to said head; and means for moving a magnetic record material across said gap in a direction generally perpendicular to the longitudinal axis thereof, whereby said effective magnetic field produces a magnetic record whose width, measured perpendicular to the direction of movement of said record material, is a function of said external signal.

6. A system for producing a variable area magnetic record of an external signal, which includes: a modulator adapted to receive said external signal and amplitude-modulate a carrier signal thereby; a magnetic recording head having a generally V-shaped gap whose reluctance varies along the longitudinal axis thereof and is adapted to produce an effective magnetic field whose extent along said longitudinal axis varies in accordance with the amplitude of the signal applied to said head; means connecting said recording head to said modulator, whereby said modulated carrier signal is applied to said head; and means for moving a magnetic record material across said gap in a direction generally perpendicular to the longitudinal axis thereof, whereby said effective magnetic field produces a magnetic record whose width, measured perpendicular to the direction of movement of said record material, is a function of said external signal.

7. A system for producing a variable area magnetic record of an external signal, which includes: a modulator adapted to receive said external signal and frequency-modulate a carrier signal thereby; a magnetic recording head having a generally X-shaped gap whose reluctance varies along the longitudinal axis thereof and is adapted to produce an effective magnetic field whose extent along said longitudinal axis varies in accordance with the frequency of the signal applied to said head; means connecting said recording head to said modulator, whereby said modulated carrier signal is applied to said head; and means for moving a magnetic record material across said gap in a direction generally perpendicular to the longitudinal axis thereof, whereby said effective magnetic field produces a magnetic record whose width, measured perpendicular to the direction of movement of said record material, is a function of said external signal.

8. A system for producing a variable area magnetic record of an external signal, which includes: a modulator adapted to receive said external signal and frequency-modulate a carrier signal thereby; a magnetic recording head having a generally X-shaped gap whose reluctance varies along the longitudinal axis thereof and is adapted to produce an effective magnetic field whose extent along said longitudinal axis varies in accordance with the amplitude of the signal applied to said head; means connecting said recording head to said modulator, whereby said modulated carrier signal is applied to said head; and means for moving a magnetic record material across said gap in a direction generally perpendicular to the longitudinal axis thereof, whereby said effective magnetic field produces a magnetic record whose width, measured perpendicular to the direction of movement of said record material, is a function of said external signal.

9. The method of producing a variable area magnetic recording of a signal, which recording can be made visible by the application of a ferromagnetic pigment, which includes the steps of: producing, by means of an electromagnet having a magnetic gap, a magnetic field whose strength varies along an imaginary line generally perpendicular to the flux of said field while the strength thereof at any given point remains constant; modulating a high frequency carrier current with a signal which is to be recorded; varying the total strength of said field by energizing the electromagnet producing said field by said modulated carrier current; and moving a magnetizable record material through said field in a direction generally parallel to said flux, the magnetizable surface of said record material being parallel to and including said imaginary line, whereby said record material is magnetized.

10. The method of producing a variable area magnetic recording of a signal, which recording can be made visible by the application of a ferromagnetic pigment, which includes the steps of: modulating a high frequency carrier current with a signal to be recorded; producing, with said modulated carrier current, a magnetic field whose strength at any given time varies along an imaginary line substantially perpendicular to the flux of said field, the total strength of said field varying with the variation in said modulated carrier current; and moving a magnetizable record material through said field in a direction generally parallel to said flux, the magnetizable surface of said record material being parallel to and including said imaginary line, whereby said record material is magnetized.

References Cited in the file of this patent

UNITED STATES PATENTS

| | | |
|---|---|---|
| 2,469,266 | Howell | May 3, 1949 |
| 2,546,850 | Chaunotte | Mar. 27, 1951 |
| 2,594,414 | Garreau | Apr. 29, 1952 |
| 2,610,257 | Wissman | Sept. 9, 1952 |
| 2,632,061 | Begun | Mar. 17, 1953 |
| 2,657,932 | Blaney | Nov. 3, 1953 |
| 2,695,211 | Guttwein | Nov. 23, 1954 |
| 2,697,755 | Friend | Dec. 21, 1954 |
| 2,743,320 | Daniels et al. | Apr. 24, 1956 |